United States Patent
Lee

(10) Patent No.: US 8,604,717 B2
(45) Date of Patent: Dec. 10, 2013

(54) METHOD AND APPARATUS FOR PROVIDING HIGH SPEED, LOW EMI SWITCHING CIRCUITS

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 12/829,542

(22) Filed: Jul. 2, 2010

(65) Prior Publication Data

US 2010/0271362 A1 Oct. 28, 2010

Related U.S. Application Data

(63) Continuation of application No. 12/004,591, filed on Dec. 21, 2007, now Pat. No. 7,760,528.

(51) Int. Cl.
*H05B 37/00* (2006.01)

(52) U.S. Cl.
USPC .... 315/312; 315/224; 315/185 S; 315/209 R; 315/291

(58) Field of Classification Search
USPC .......... 315/185 S, 282, 274–279, 312
See application file for complete search history.

(56) References Cited

U.S. PATENT DOCUMENTS

| 5,030,852 A | 7/1991 | Higashisaka |
| 5,751,120 A | 5/1998 | Zeitler et al. |
| 2008/0116824 A1* | 5/2008 | Hsu et al. ............ 315/277 |

FOREIGN PATENT DOCUMENTS

| JP | 1098112 A | 4/1998 |
| JP | 2004233569 A | 8/2004 |
| JP | 2006189593 A | 7/2006 |

OTHER PUBLICATIONS

Marty Brown, "Considerations in Designing the Printed Circuit Board of Embedded Switching Power Supplies"; Fairchild, Application Note AN-1031, pp. 1-15, Apr. 30, 1999.
International Search Report and Written Opinion of Feb. 17, 2009 in related copending PCT International Patent Application No. PCT/US2008/008681.

* cited by examiner

*Primary Examiner* — Tuyet Thi Vo
(74) *Attorney, Agent, or Firm* — Fletcher Yoder PC

(57) ABSTRACT

Methods and apparatus are provided for generating low EMI display driver power supply. The methods and apparatus include switching circuits that utilize two groups of parallel circuit traces, each of which is coupled to one end of a switching device. The two groups of traces are configured to be interleaved with each other such that no two traces from either group are next to any other traces from the same group. When the switching device is activated, current flows through the circuit and charges an energy storage element. When the switching device is deactivated, the energy storage element discharges a portion of its energy to a second energy storage element and to the driver circuits. In another embodiment, an additional circuit trace is provided which is only connected on one end and is free floating on the other end to capture the majority of EMI remaining that was generated by the switching circuit.

19 Claims, 4 Drawing Sheets

METHOD AND APPARATUS FOR PROVIDING HIGH SPEED, LOW EMI SWITCHING CIRCUITS

CROSS-REFERENCE TO RELATED APPLICATION

This application is a continuation of copending, commonly-assigned U.S. patent application Ser. No. 12/004,591, filed Dec. 21, 2007, which is fully incorporated by reference herein in its entirety.

BACKGROUND OF THE INVENTION

This relates to switching circuitry that may be used to drive display drivers, and particularly to providing switching circuitry that operates at switching high speeds while producing low EMI output.

There are various well known techniques for generating supply voltages to display driver circuits. In one instance, for example, a charge pump circuit may be used to act as a high voltage power source for a display driver. In that instance, the charge pump could be configured to first charge a capacitor to a given voltage from a battery. Once charged, the capacitor may be placed in a series connection with the battery to effectively double the output voltage. For example, a 3 volt battery may be used to charge a capacitor, which could then be placed in series with the battery to provide a 6 volt output. Charge pumps often operate at relatively high energy efficiencies, but often don't provide as much current as other methods, such as a switching regulator. For example, typical charge pumps provide energy at power conversion efficiency on the order of about 90%.

Another well known technique for providing energy to display driver circuits is to use a switching regulator circuit. In a switching regulator circuit, a switch is used to charge and discharge an active element, such as an inductor, to provide an output voltage. Switching regulators are often used to supply high current, however, such circuits typically generate radiated energy as part of the switching process. The radiated energy is often observed as noise on the circuits surrounding the switching regulator. Switching regulator circuits often produce lower power conversion efficiency, which can be on the order of 80-85% efficiency.

Charge pump circuits may provide energy without the introduction of noise, however, that energy is produced at a lower current driving capability due to the large internal resistance of such circuits. This may not be an issue in instances where the display itself is relatively small, such as the display on an Apple iPod Nano product. However, conventional charge pump circuits may not be able to provide the current necessary to drive a larger display, such as the ones used on Apple's iPhone and iPod Touch products.

SUMMARY OF THE INVENTION

In accordance with embodiments of the invention, methods and apparatus are provided for generating supply voltages for display driver circuits at very high efficiencies and with low quantities of radiated energy (i.e., low noise). In particular, the methods and apparatus are provided to utilize switching regulator circuits that have been modified such that multiple circuit paths are created which carry electric current in opposite directions in order to cancel out the radiated noise of each path. In addition, additional terminal lines are provided which act to sink any electromagnetic interference (EMI) generated in the outermost paths that are actively coupled to the circuit (e.g., the paths in which current flows).

Embodiments of the present invention provide the capability to produce relatively large amounts of current, which can be used in driver circuits for relatively large displays such as the Apple iPhone display, without incurring the typical penalties associated with EMI or noise in such implementations. In conventional implementations of chip on glass (COG), an integrated circuit (IC) may be located on one side of the glass used in displays. The IC may include a transistor which operates as the switch in the switching regulator. The transistor may include multiple parallel leads connected to the source and multiple parallel leads connected to the drain. The leads may be connected to a piece of flex circuitry to complete the circuit via circuit elements formed of indium tin oxide (ITO). ITO is particularly useful in display applications because it is a transparent material, but it has a high resistance (it may be on the order of about 10 ohms or so), which can result in a voltage drop of about 500 millivolts.

In one embodiment of the present invention, the parallel source and drain paths are configured in an alternating relationship, such that a source path to ground is placed between each two drain paths which are configured to provide the output voltage. In this manner, the EMI generated in the source paths is cancelled by the EMI generated in the drain paths, because the currents through them flow in the opposite direction to each other.

In another embodiment of the present invention, the reduction in EMI is more pronounced by the use of a terminal lead (i.e., a lead that is only connected at one end) at the periphery edges of the circuit. The terminal leads act essentially as RF antennas to pick up any leaking fields generated by the last fully-connected paths in the circuit.

Various other alternative embodiments are possible.

Therefore, in accordance with the present invention, there is provided methods and apparatus for producing sufficient current to drive circuits for relatively large displays, such as the Apple iPhone, which do not generate the electromagnetic interference (EMI) typically associated with such circuits. In addition, the reduction in EMI can be increased through the use of terminal leads.

Media player apparatus operating in accordance with the methods and circuits of the present invention are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
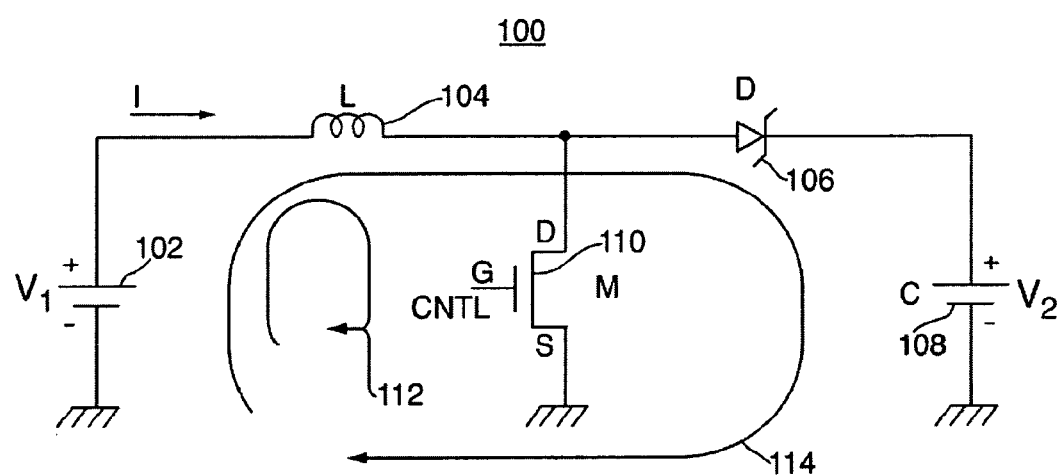
FIG. 1 is a schematic diagram of a switching regulator which may be used in accordance with an embodiment of the present invention.

FIG. 1 shows a switching regulator circuit 100 that can be implemented in accordance with the principles of the present invention. Switching regulator 100 may include a voltage source 102 that produces a voltage V, an inductor 104 that stores a current I, a diode 106 that prevents energy from the output device from being drained by the switching regulator, and a transistor switch 110. Diode 106 is coupled to capacitor 108, which provides the output voltage to the display driver circuit (not shown). As shown, voltage source 102 is configured to be connected between ground and inductor 104. Inductor 104 may be coupled to both diode 106 and to the drain of transistor 110 to provide operation as described below. The source of transistor 110 is coupled to ground, while the gate of transistor 110 is coupled to a control line. This configuration is commonly known as a boost regulator.

Figure 2:
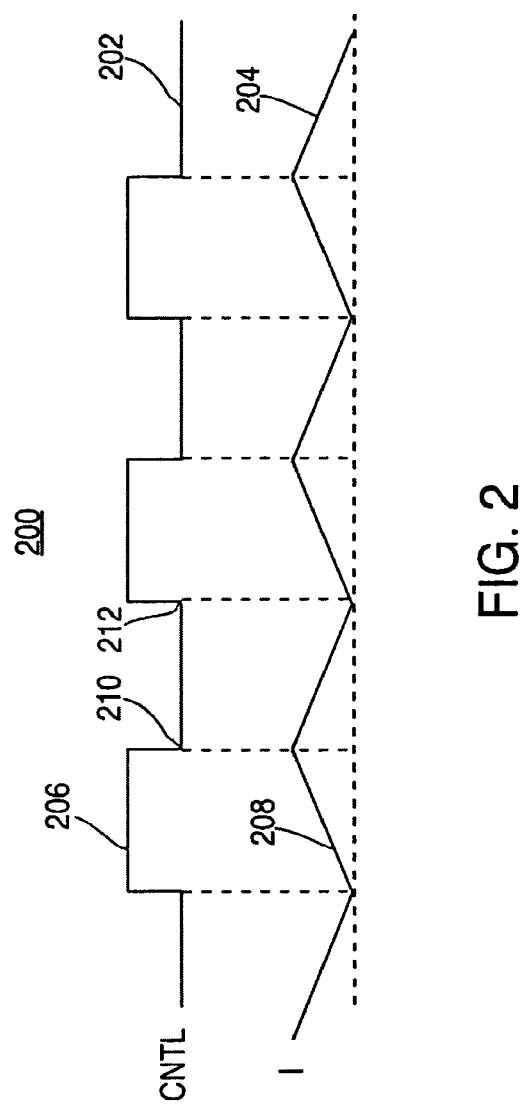
FIG. 2 is a timing diagram depicting the operation of a switching regulator such as the switching regulator shown in FIG. 1 in accordance with an embodiment of the present invention.

FIG. 2 shows a control timing diagram 200 that may be used to show the operation of switching regulator 100. Timing diagram 200 may include, for example, control trace 202, which would be the control signal applied to the gate of transistor 110 of FIG. 1. Timing diagram 200 may also include current trace 204, which shows the current being conducted by inductor 104 of FIG. 1. If the current passing through inductor 104 remains constant, there will be essentially no voltage drop across inductor 104 (a negligible drop related to the copper used to form the windings of inductor 104 will occur).

Switching regulator 100 may be operated in the following manner. When the control signal 202 is HIGH, for example at time 206, the voltage on the gate of transistor 110 causes current to flow from the drain to the source of transistor 110 (and then on to ground). Thus, voltage source 102 provides an input voltage to inductor 104 that causes the current flowing through inductor 104 to ramp up, as shown at time 208 in current trace 204 (as shown by arrow 112 in FIG. 1). Once the control signal at the gate of transistor 110 switches to a LOW state, as shown at time 210 in FIG. 2, the switch end of inductor 104 (i.e., the end coupled to diode 106 and to transistor 110) swings positive, which causes diode 106 to become forward-biased. This causes current to flow through diode 106 and through capacitor 108 to ground, thereby enabling capacitor 108 to be charged to a voltage that is higher than the voltage of source 102. Thus, at that time, the circuit follows the path shown by arrow 114 in FIG. 1.

The output voltage V2 across capacitor 108 may vary slightly as the switch turns ON and OFF. However, the speed at which the switching occurs may result in little variance in the output voltage V2. This is why the "efficiency" of switching is so high (90% or higher). While the gate of transistor 110 is in the LOW (or OFF) state, the current flowing from inductor 104 will actually flow to both capacitor 108, as well as to the load connected to capacitor 108. In order to limit the current flowing from diode 106 from falling below a certain level, at time 212, for example, the control signal applied to the gate of transistor 110 switches back to a HIGH state, once again causing the circuit to operate as indicated by arrow 112 in FIG. 1. During that time, the output load is provided energy solely from capacitor 108, as inductor 104 is charged back up.

Figure 3:
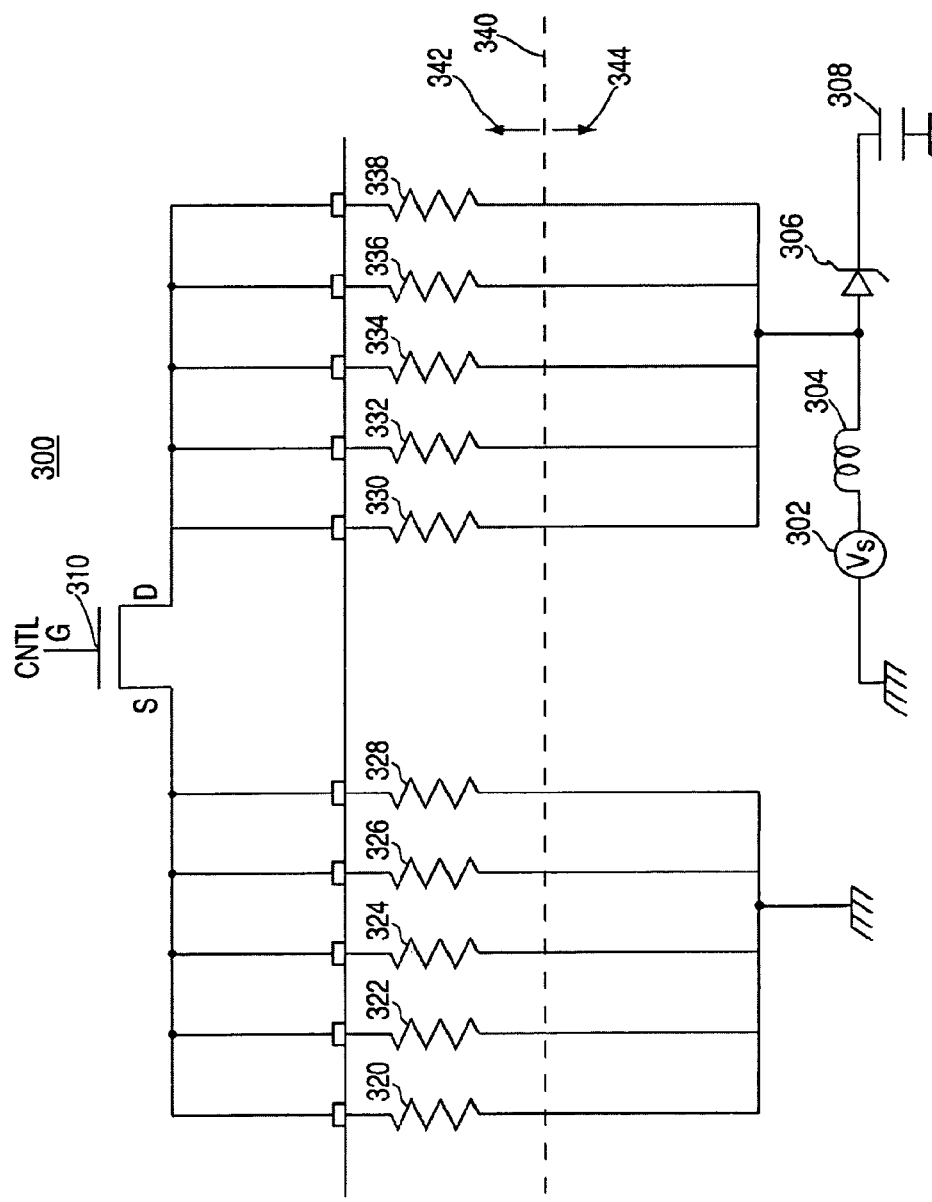
FIG. 3 is a schematic diagram of a conventional implementation of a switching regulator to provide drive current to a digital display in accordance with an embodiment of the present invention.

FIG. 3 shows one implementation of a switching regulator circuit 300 used to generate direct voltage (DC) for a digital video display (not shown). Switching regulator 300 may include inductor 304, diode 306 and transistor 310 (elements 304, 306 and 310 may be similar to those previously described with respect to FIG. 1). Instead of using a substance such as copper or gold for the bonding wire, however, it may be preferable to use indium tin oxide (ITO) because it is transparent (which is needed since the circuit is being used to drive a display). ITO, unlike gold, has a relatively high resistance, which can be something on the order of about 10 ohms, but can be as high as 50 ohms or more. In order to reduce the resistance, multiple traces are used for a single switch. For example, by breaking up a signal which would have had a resistance of 50 ohms into four paths, the resistance of each path drops to 12.5 ohms (50 divided by 4).

FIG. 3 also shows a series of resistors 320-328 that are coupled in parallel between the source of transistor 310 and ground, as well as a series of resistors 330-338 that are coupled between the drain of transistor 310 and inductor 304 and diode 306. Each of these "resistors" is not an actual, physical, resistor that has been coupled into regulator 300. Instead, each of these resistors represents the resistance of the ITO material that is used as a "bonding wire" in regulator 300. In addition to the components shown, regulator 300 also includes voltage source 302 and capacitor 308, both of which operate as previously described with respect to FIGS. 1 and 3 (in which similarly numbered elements were described—e.g., voltage source 102 in FIG. 1 versus voltage source 302 in FIG. 3). The division between glass and flex circuitry is shown generally by dashed line 340, such that the "glass" side is represented by arrow 342, while the "flex" side is represented by arrow 344.

As generally described above, regulator 300 operates in a manner similar to that of regulator 100. As the gate of transistor 302 is switched from LOW to HIGH, current flowing through inductor 304 will ramp up causing diode 306 to become reverse-biased (and thereby to act as a blocking diode). Current will continue to flow through parallel "resistors" 330-338, through transistor 310, and through parallel "resistors" 320-328. When the gate of transistor 310 is switched from HIGH to LOW, current flows directly from inductor 304 through diode 306 (which is then forward-biased), to capacitor 308, which charges capacitor 308 to a voltage higher than the voltage of voltage source 302, as well as providing current from inductor 304 directly to the load attached to capacitor 308.

One of the problems associated with the use of regulators like regulator 300 is the relatively large amount of EMI produced by the circuit. This is particularly troublesome in instances where the regulator circuit is being used to drive a display of a device that may be susceptible to such interference, such as a cellular or WIFI communications device (although the EMI problems could, in fact, negatively affect such operations as the playback of audio or video files). In those instances, the interference may cause an unacceptable degradation in the quality of the transmitted and/or received signals that the user's experience becomes virtually intolerable. Alternatively, the generation of EMI may require the hardware designers to implement complicated and potentially expensive solutions to deal with the EMI. These solutions could also potentially add to the overall weight and/or size of the device that the regulator is to be used in.

Figure 4:
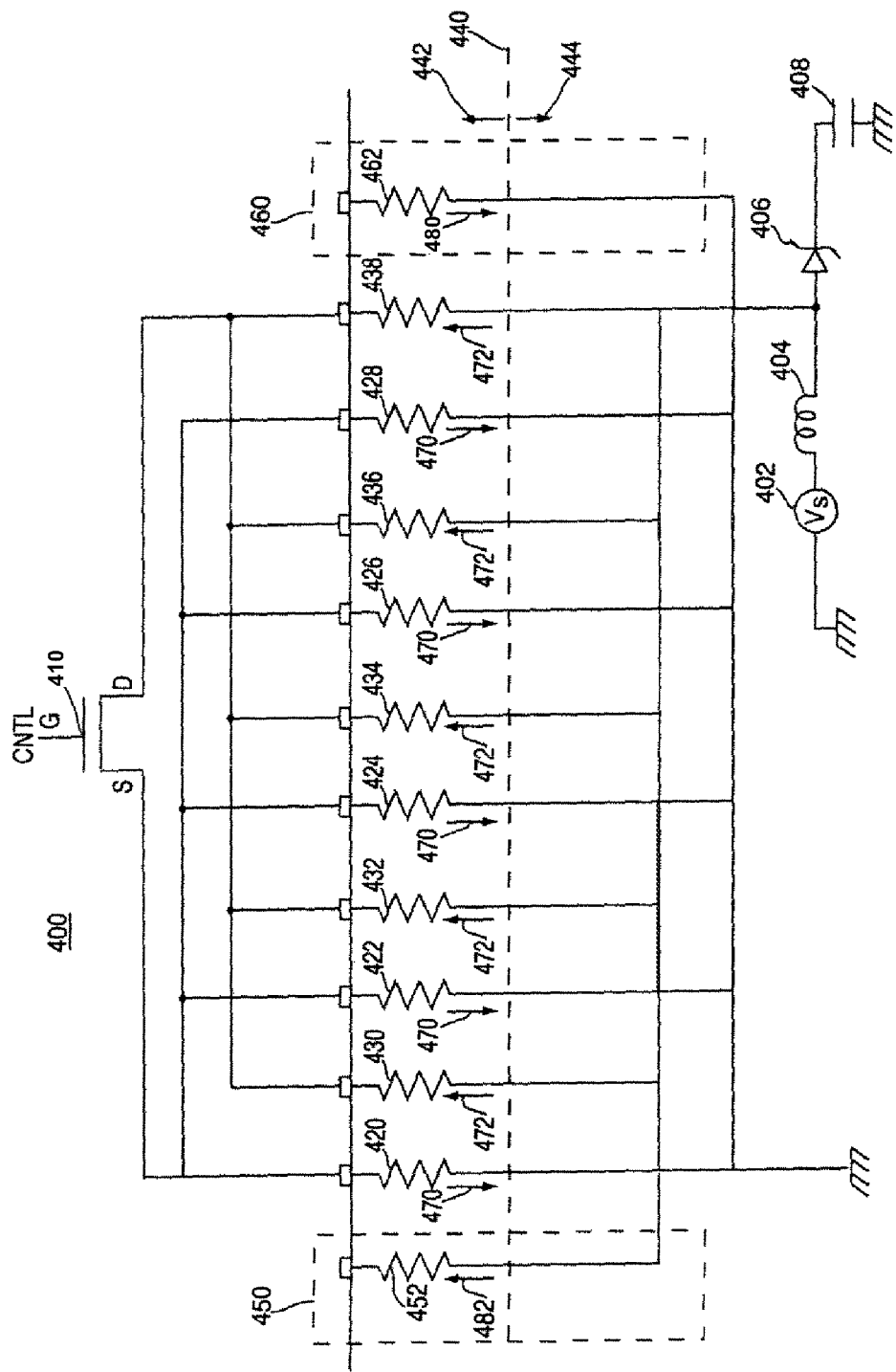
FIG. 4 is a schematic diagram illustrating various embodiments of the present invention.

FIG. 4 shows a switching regulator 400 which has been configured to operate in accordance with the principles of the present invention. Switching regulator 400 provides a high efficiency output which is capable of driving relatively large digital video displays with low EMI emissions. The displays can be on the order of the size of, for example, an Apple iPhone of Apple iPod Touch, or even larger.

Switching regulator 400 includes voltage source 402, inductor 404, diode 406, capacitor 408 and transistor 410. Each of these components operates in a similar manner as described above with respect to FIGS. 1 and 3. In addition, switching regulator 400 includes source "resistances" 420-428 and drain "resistances" 430-438 which, as described above, are not discrete, physical resistors, but are, in fact, representative of the resistance which occurs from the use of indium tin oxide instead of gold for the bonding wire. The division between the glass and the flex circuitry is generally indicated by dashed line 440, with arrow 442 indicating generally the glass side, and arrow 444 generally indicating the flex side.

Unlike the configuration shown in FIG. 3, switching regulator 400 produces little to no electromagnetic interference. This is accomplished by configuring the parallel source paths and the parallel drain paths in a specific manner. In particular, in accordance with the principles of the present invention, the parallel source paths are interleaved with the parallel drain paths. For example, drain path 430 is configured to be in between parallel source paths 420 and 422. Source path 422 is between parallel drain paths 430 and 432. Drain path 432 is between parallel source paths 422 and 424, and so on.

The interleaving of source and drain paths provides the positive result that EMI produced on one path is substantially cancelled by the EMI produced on one or more adjacent paths. This is illustrated in FIG. 4 by arrows 470 and 472. Arrows 470 show that, when the control signal applied to the gate of transistor 410 is HIGH (and current is flowing through transistor 410), the current through the source paths is flowing downward, from the glass area to the flex area. At the same time, however, the current flowing through drain paths is flowing upward, from the flex to the glass, as shown by arrows 472. Since the current flowing through a source path should be substantially the same as the current flowing through a drain path, but in the opposite direction, the EMI generated in one path should be substantially cancelled out by the EMI generated in the other path.

Operation of switching regulator 400 is similar to the operation described previously with respect to FIGS. 1-3, except that switching regulator produces significantly less EMI and/or noise than the previously described switching regulators. When the control signal applied to the gate of transistor 410 is HIGH, such that current flows through transistor 410, EMI produced through the source paths is essentially canceled by the EMI produced through the drain paths, which is traveling in the opposite direction. When the control signal applied to the gate of transistor 410 is LOW, current flows from inductor 404 and does not pass through transistor 410. Accordingly, little to no EMI is generated in that instance as well.

An additional embodiment of the present invention is also shown in FIG. 4. It may be additionally advantageous, in accordance with the principles of the present invention, to provide two additional paths, shown as dashed components 450 and 460, to further reduce EMI effects, while maintaining a highly efficient switching regulator. In particular, it may be advantageous to add an additional drain path shown by "resistance" 452, as well as an additional source path shown by "resistance" 462. These paths are configured such that they are "terminal" paths, in that they are only connected at one end. Moreover, because of this configuration, there will not be any current flowing through these paths. However, the paths will still operate to pick up any leaking EMI field generated by the adjacent paths. This pick up effect is indicated by arrows 480 and 482. For example, arrow 480 is shown to be pointing toward the bottom of FIG. 4, to indicate that it will absorb any counter leaking EMI in the opposite direction as indicated by arrow 472 on path 438. The terminal paths would only be necessary next to the outer most fully functional paths (i.e., in FIG. 4, the outer most fully functional paths are shown by reference numerals 420 and 438).

Thus it is seen that methods and apparatus for producing low EMI energy at levels necessary to drive varying sizes of digital displays are provided. The present invention produces current sufficient to drive relatively large digital displays, such as the touch screen on the Apple iPhone, without generating the negative effects of high EMI radiation. It will be understood that the foregoing is only illustrative of the principles of the invention, and that various modifications can be made by those skilled in the art without departing from the scope and spirit of the invention, and the present invention is limited only by the claims that follow.

What is claimed is:

1. Apparatus for generating supply voltages comprising:
    a switching element;
    a first plurality of circuit paths coupled between a first portion of the switching element and ground; and
    a second plurality of circuit paths coupled between a second portion of the switching element and a junction, wherein the first plurality of circuit paths are interleaved with the second plurality of circuit paths;
    wherein:
        the switching element comprises a transistor;
        the first portion of the switching element is a source of the transistor; and
        the second portion of the switching element is a drain of the transistor.

2. The apparatus of claim 1, wherein the first plurality of circuit paths are interleaved with the second plurality of circuit paths such that no circuit path of the first and second pluralities of circuit paths is adjacent a circuit path of the same plurality.

3. The apparatus of claim 1, wherein the first plurality of circuit paths are inter leaved with the second plurality of circuit paths such that each circuit path of the first plurality of circuit paths is at least one of (1) adjacent to at least one circuit path of the second plurality of circuit paths and (2) is not adjacent to any other circuit path of the first plurality of circuit paths.

4. The apparatus of claim 1, wherein the first plurality of circuit paths are interleaved with the second plurality of circuit paths such that no two circuit paths of the same plurality of circuit paths are adjacent to one another.

5. The apparatus of claim 1, wherein the first plurality of circuit paths are interleaved with the second plurality of circuit paths such that one of said first and second plurality of circuit paths are adjacent a circuit path of the same plurality.

6. The apparatus of claim 1, wherein the first portion of the switching element is coupled to control circuitry that controls the rate at which the switching element switches between HIGH and LOW states.

7. The apparatus of claim 1, wherein at least one circuit path of the first plurality of circuit paths is formed from indium tin oxide (ITO).

8. The apparatus of claim 7, wherein at least one circuit path of the second plurality of circuit paths is formed from indium tin oxide (ITO).

9. The apparatus of claim 1, further comprising:
    a voltage supply;
    a first energy storage element coupled at a first end to the voltage supply; and
    a second energy storage element coupled to a second end of the first energy storage element and to ground, wherein the junction is between the first and second energy storage elements.

10. The apparatus of claim 9, wherein the first energy storage element comprises an inductor.

11. The apparatus of claim 9, wherein the second energy storage element comprises a capacitor.

12. A method for generating energy for driving a device component comprising:

switching a switching element between a LOW state and a HIGH state causing current to flow through the switching element;

directing the flowing current through a first plurality of circuit traces coupled between a first portion of the switching element and ground;

conducting at least a portion of the current from ground through a source of energy to a first energy storage element; and causing at least a portion of the current to pass from the first energy storage element through a second plurality of circuit traces to a second portion of the switching element, the first plurality of circuit traces being interleaved with the second plurality of circuit traces.

13. The method of claim 12, wherein the first plurality of circuit paths are interleaved with the second plurality of circuit paths such that no circuit path of the first and second pluralities of circuit paths is adjacent a circuit path of the same plurality.

14. The method of claim 12, wherein:
the switching comprises removing a control signal from the gate of a transistor; and
the method further comprises sending current from the first energy storage element to a second energy storage element coupled to the device component only when the control signal is removed.

15. The method of claim 12, further comprising at least one of:
picking up fields leaking from one circuit trace of the second plurality of circuit traces using an additional one of the first plurality of circuit traces, wherein the additional one of the first plurality of circuit traces is coupled at one end to at least one other circuit trace of the first plurality of circuit traces, wherein the additional one of the first plurality of circuit traces is free at another end, and wherein the additional one of the first plurality of circuit traces is only adjacent to one circuit trace of the second plurality of circuit traces; and
picking up fields leaking from one circuit trace of the first plurality of circuit traces using an additional one of the second plurality of circuit traces, wherein the additional one of the second plurality of circuit traces is coupled at one end to at least one other circuit trace of the second plurality of circuit traces, wherein the additional one of the second plurality of circuit traces is free at another end, and wherein the additional one of the second plurality of circuit traces is only adjacent to one circuit trace of the first plurality of circuit traces.

16. A display panel comprising:
a piece of display glass;
display driver circuitry mounted to the glass;
voltage supply generation circuitry electrically coupled to the display driver circuitry, the voltage supply generation circuitry comprising:
a switching element;
a first plurality of circuit paths coupled between a first portion of the switching element and ground; and
a second plurality of circuit paths coupled between a second portion of the switching element and a junction, the first and second plurality of circuit paths being interleaved with each other such that:
each circuit path of the first plurality of circuit paths is next to at least one circuit path of the second plurality of circuit paths; and
each circuit path of the second plurality of circuit paths is next to at least one circuit path of the first plurality of circuit paths;
wherein:
the switching element comprises a transistor;
the first portion of the switching element is a source of the transistor; and
the second portion of the switching element is a drain of the transistor.

17. Apparatus for generating supply voltages comprising:
a switching element;
a first plurality of circuit paths coupled between a first portion of the switching element and ground;
a second plurality of circuit paths coupled between a second portion of the switching element and a junction, wherein the first plurality of circuit paths are interleaved with the second plurality of circuit paths;
a voltage supply;
a first energy storage element coupled at a first end to the voltage supply; and
a second energy storage element coupled to a second end of the first energy storage element and to ground, wherein the junction is between the first and second energy storage elements; and
a diode, wherein an anode of the diode is coupled to the second end of the first energy storage element, and a cathode of the diode is coupled to the second energy storage element, such that the diode is coupled between the first and second energy storage elements.

18. Apparatus for generating supply voltages comprising:
a switching element;
a first plurality of circuit paths coupled between a first portion of the switching element and ground; and
a second plurality of circuit paths coupled between a second portion of the switching element and a junction, wherein the first plurality of circuit paths are interleaved with the second plurality of circuit paths;
a first leaking field pick up trace, wherein:
a first end of the first leaking field pick up trace is coupled to the first portion of the switching element;
a second end of the first leaking field pick up trace is free-floating; and the first leaking field pick up trace is only adjacent one circuit path of the second plurality of circuit paths; and the first leaking field pick up trace is not adjacent any of the first plurality of circuit paths.

19. The apparatus of claim 18, further comprising a second leaking field pick up trace, wherein:
a first end of the second leaking field pick up trace is coupled to the second portion of the switching element;
a second end of the second leaking field pick up trace is free-floating; and
the second leaking field pick up trace is configured such that:
the second leaking field pick up trace is only adjacent one circuit path of the first plurality of circuit paths; and
the second leaking field pick up trace is not adjacent any of the second plurality of circuit paths.

* * * * *